UNITED STATES PATENT OFFICE.

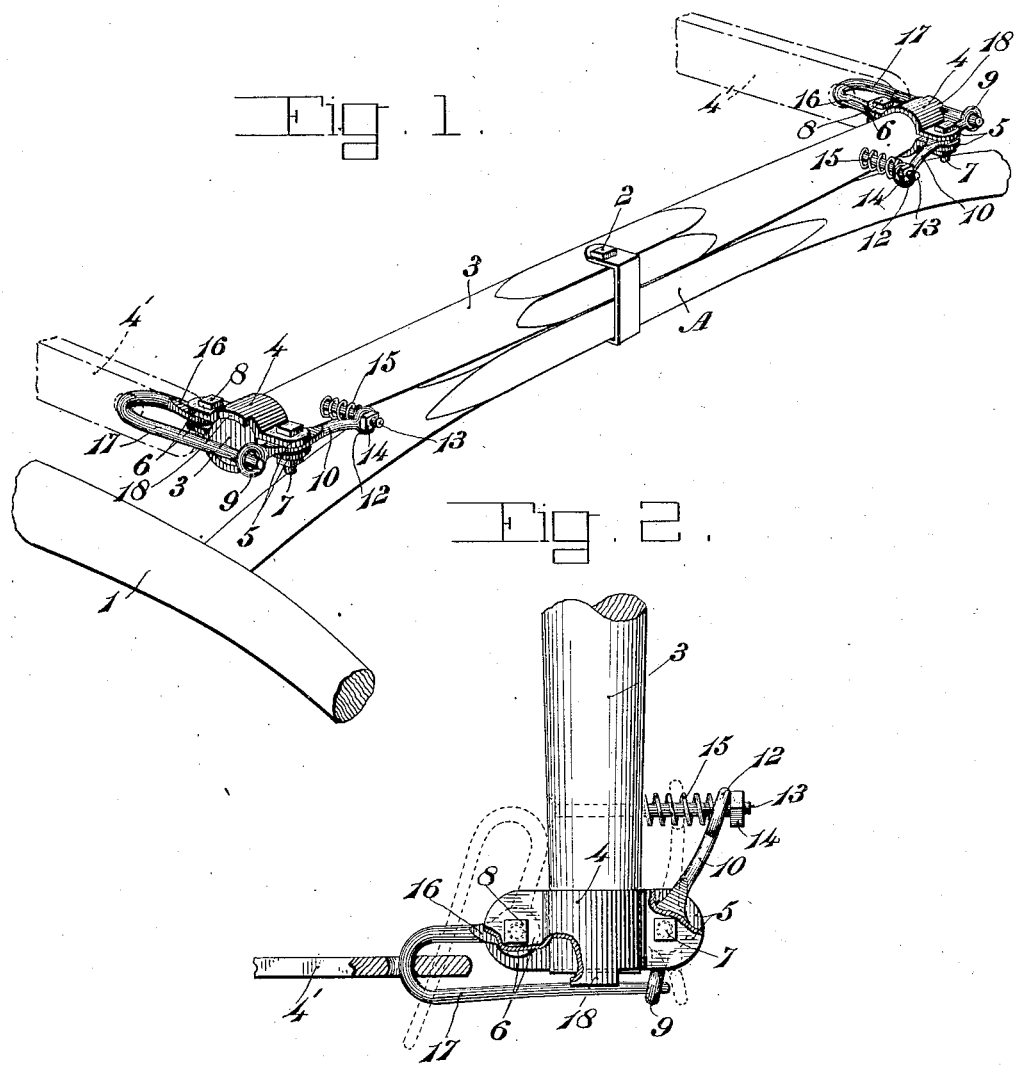

HERMAN J. DINGFELDER, OF FOUNTAIN CITY, WISCONSIN.

SWINGLETREE-HOOK.

1,082,738.  Specification of Letters Patent.  Patented Dec. 30, 1913.

Application filed March 19, 1913. Serial No. 755,501.

*To all whom it may concern:*

Be it known that I, HERMAN J. DINGFELDER, a citizen of the United States, and a resident of Fountain City, in the county of Buffalo and State of Wisconsin, have invented certain new and useful Improvements in Swingletree-Hooks, of which the following is a specification, reference being had to the accompanying drawings.

This invention relates to certain new and useful improvements in swingle tree hooks; and the object of my invention is to provide a safety swingle tree hook so constructed that the trace or tug cannot accidentally become detached from the swingle tree hook.

A further object is to provide a safety swingle tree hook of a simple and inexpensive nature and of a durable construction, arranged so that when released the tug can be expeditiously removed therefrom.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification and in which like numerals of reference indicate similar parts in the several views: Figure 1, shows a perspective view of a swingle tree provided with safety hooks embodying my invention. Fig. 2, is a top view with parts broken away of one of the hooks disclosing the same in released condition in dotted outline.

In my present invention I provide a swingle tree hook including two counterpart half collars 4, 4, each half collar being provided with a forward apertured ear 6, and a rear apertured ear 5. These half collars are arranged to be clamped upon the end of the swingle tree 3. In Fig. 1, of the drawings, I have shown a broken portion of one of the shafts 1, with the connecting bar A, carrying the king bolt 2, upon which the swingle tree 3, is pivotally held. The half collars 4, are clamped upon the end of the swingle tree by means of the bolts 7 and 8.

Pivotally held between the ears 5, upon the bolt 7, is the operating lever 10, ending in the loop 12. This loop 12, is arranged for coaction with the guide pin 13, which passes through the swingle tree and is provided with the stop nut 14, a spring 15, being interposed between the swingle tree and the loop 12, to normally force this loop against the stop nut 14, as shown in the drawings.

Pivotally held upon the bolt 8, is the swingle tree hook 16, having the stem 17, which extends across the end of the swingle tree 3, and terminates adjacent to the rear ears 5, the instrumentalities being so arranged that in the normal working position of the hook the stem 17, at its end engages within the eye 9, as shown in Fig. 2. The half collars 4, are provided with the lip extensions 18, which are arranged to project slightly beyond the end of the swingle tree 3.

The tug 4', is arranged to be brought into engagement with the swingle tree hook 16. When it is desired to release the tug the operator simply depresses the lever 10, which allows the hook stem 17, to escape from the eye 9. In this position the hook can be readily thrown outward, as shown in dotted lines in Fig. 2, so that the tug will escape from the hook.

These safety swingle tree hooks are made in various sizes and are simple and comparatively inexpensive in construction, and both durable and efficient in operation, while the tug can be secured to the hook or released therefrom with ease, accuracy and despatch.

Having thus described my said invention, what I claim as new and desire to secure by United States Letters Patent is:

1. A swingle tree hook having in combination, two counterpart half collars each ending in a forward and a rear apertured ear, of a bolt passing through said forward ears, a hook pivotally held upon said bolt between said ears having a stem terminating adjacent to said rear ears, a bolt passing through said rear ears, a lever upon said rear bolt held between said ears ending in an eye at one end arranged for coaction with said hook stem, said lever ending in a loop at the opposite end, a guide pin passing through said loop, a stop at the end of said pin, and a spring to normally force said loop against said stop, said eye normally engaging said hook stem, as and for the purpose set forth.

2. The combination with a swingle tree, of two counterpart half collars each ending in a forward and a rear apertured ear, of bolts passing through said apertured ears to clamp said half collars upon the end of said swingle tree, a hook pivotally held upon said forward bolt ending in a stem terminating adjacent to said rear ears said stem crossing the end of said swingle tree, a lever pivotally held upon said rear bolt ending in an eye normally engaging said hook stem and having a loop at the opposite end, a guide pin secured to said swingle tree passing through said loop, a stop at the end of said pin, and a spring upon said pin to normally force said loop outward against said stop, all arranged as and for the purpose set forth.

In testimony whereof I affix my signature, in the presence of two witnesses.

HERMAN J. DINGFELDER.

Witnesses:
 ROMEO KASTE,
 CHARLES F. PRUSSING.

Copies of this patent may be obtained for five cents each, by addressing the "Commissioner of Patents, Washington, D. C."